US007381477B2

(12) United States Patent
Shipton

(10) Patent No.: US 7,381,477 B2
(45) Date of Patent: Jun. 3, 2008

(54) RARE EARTH-TRANSITION METAL ALLOY ARTICLES

(75) Inventor: Mark H. Shipton, deceased, late of Bristol (GB); by J. M. Shipton, legal representative, Bristol (GB)

(73) Assignee: Rolls-Royce, PLC, London (GB)

( * ) Notice: Subject to any disclaimer, the term of this patent is extended or adjusted under 35 U.S.C. 154(b) by 297 days.

(21) Appl. No.: 10/540,533

(22) PCT Filed: Nov. 26, 2003

(86) PCT No.: PCT/GB03/05210

§ 371 (c)(1),
(2), (4) Date: Jul. 19, 2005

(87) PCT Pub. No.: WO2004/064089

PCT Pub. Date: Jul. 29, 2004

(65) Prior Publication Data

US 2006/0251926 A1 Nov. 9, 2006

(30) Foreign Application Priority Data

Jan. 14, 2003 (GB) ................................ 0300753.1

(51) Int. Cl.
*B32B 15/04* (2006.01)
*B32B 15/18* (2006.01)
*B32B 15/20* (2006.01)
*C25D 3/50* (2006.01)
*B05D 5/00* (2006.01)

(52) U.S. Cl. ...................... 428/670; 428/681; 427/127; 205/264

(58) Field of Classification Search ................ 428/812, 428/813, 814, 670, 678, 679, 680, 681, 685, 428/928, 935; 205/264; 427/127
See application file for complete search history.

(56) References Cited

U.S. PATENT DOCUMENTS 4,837,114 A 6/1989 Hamada et al.
4,942,098 A * 7/1990 Hamamura et al. ......... 428/555
4,959,273 A * 9/1990 Hamamura et al. ......... 428/548

FOREIGN PATENT DOCUMENTS

EP 0 361 308 A1 4/1990

OTHER PUBLICATIONS

Christina H. Chen et al.; "Surface Reaction and Sm Depletion at 550° C. for High Temperature Sm-TM Magnets"; IEEE Transactions on Magnetics; vol. 37, No. 4; pp. 2531-2533; Jul. 2001.

* cited by examiner

*Primary Examiner*—Michael La Villa
(74) *Attorney, Agent, or Firm*—Oliff & berridge, PLC

(57) ABSTRACT

This invention provides a rare earth-transition metal (RE-TM) alloy structure comprising a RE-TM alloy substrate and a noble metal diffusion barrier disposed thereon. The noble metal diffusion barrier may be provided on the surface of the alloy substrate by an electroplating technique.

15 Claims, No Drawings

RARE EARTH-TRANSITION METAL ALLOY ARTICLES

The present invention relates to rare earth-transition metal (RE-TM) alloy articles having a protective coating, and particularly RE-TM based alloy high temperature permanent magnet components which have a metallic diffusion barrier that is oxidation resistant. The invention also relates to a method of forming such protective coatings on RE-TM alloy articles.

High temperature permanent magnets made from RE-TM alloys are well known for use in a variety of applications, such as in motors and generators for aircraft and spacecraft systems, at temperatures above 200° C. The alloy used in these magnets may be represented by the general formula $RE(Co_wFe_vCu_xTM_y)_z$, where RE is a rare earth element and TM is a transition metal. Such magnets have also been used in actuators, inductors, inverters, magnetic bearings, and regulators for flight control surfaces and other aircraft components. Such applications have required magnets that can operate at temperatures up to about 300° C. In recent years there has been a need for magnetic and electromagnetic materials that are capable of reliable operation at elevated temperatures above 300° C., for example up to 550° C. Recently, a new class of $Sm(Co_wFe_vCu_xZr_y)_z$ permanent magnetic materials has been developed to produce magnets for use up to 700° C. (U.S. Pat. No. 6,451,132, the content of which is hereby incorporated by reference in its entirety).

Exposure to such high temperatures presents problems because of the reactions that occur between the magnets and the environment. That is, surface oxidation and elemental depletion result in the degradation of magnetic properties.

In IEEE Trans. Magn. 37(4), 2531 (2001), Chen et al. conducted an investigation using SEM/EDXA and EPMA/WDXA to study the microstructure formed in $Sm_2(Co,Fe,Cu,Zr)_{17}$ magnets after long term exposure to air at 550° C. It was found that the permanent magnetic loss observed was partly due to surface oxidation, but mainly due to Sm depletion. At the surface layer, Sm is lost by vaporisation, leaving an oxide of Fe—Co. However, Sm depletion also occurs in a zone between the surface layer and the matrix of the samples. In this affected zone, many Sm free Fe—Co—Cu stripes are formed as part of the process of Sm atoms migrating toward the surface layer and eventually evaporating.

Sputter-coated silica has been used as a coating for RE-TM permanent magnetic components. However, this material is extremely fragile and is not suitable for components that are subject to thermal cycling, which includes aerospace components.

In IEEE Trans. Magn. 37(4), 2531 (2001), Chen et al. teaches the application of a two-layer coating to various Sm-TM high temperature magnets before exposure at 550° C. in air. The top layer is a relatively dense Al coating, and the second layer is ceramic.

According to the present invention, there is provided a rare earth transition metal (RE-TM) alloy structure comprising a RE-TM alloy substrate and a noble metal diffusion barrier disposed thereon, therein the RE-TM alloy is a magnetic alloy in which the rare earth element is samarium and the noble metal diffusion barrier comprises platinum metal.

The noble metal coating acts as a physical barrier to a medium, such as oxygen, capable of degrading the substrate under the intended conditions of use, substantially preventing the medium from contacting the underlying substrate, at least in degradative amounts. Furthermore, it should not induce alloy instability or form damaging intermetallic phases when in contact with the base alloy.

Structures according to the present invention may be used as high temperature permanent magnets, for applications in the aerospace industry which may include operation at elevated temperatures, for example at temperatures above 200° C. The present invention also extends to permanent magnet components, particularly aerospace components, such as components of electronic aerospace engines. For example, the permanent magnet components of the invention may be used in motors or generators for aircraft and spacecraft systems. They may also be used in, for example, actuators, inductors, inverters, magnetic bearings, or regulators for flight control surfaces and other aircraft components.

According to another aspect of the present invention, there is provided a method of reducing rare earth metal depletion at the surface of a RE-TM permanent magnet, preferably a SM-TM high temperature permanent magnet, which method comprises providing over the surface a noble metal diffusion barrier.

In its first aspect, the invention relates to a RE-TM alloy structure in which a noble metal diffusion barrier is disposed on the alloy substrate. In its broadest aspect, the diffusion barrier may be disposed over a portion of the alloy substrate, for example a portion of the surface of the alloy substrate which is to be exposed to conditions which would otherwise result in surface degradation. In some embodiments of the present invention, the whole of the alloy substrate will be provided with the diffusion barrier.

The RE-TM alloy used may be an alloy in which RE is a rare earth element selected from the group consisting of Sm, Gd, Pr, Nd, Dy, Ce, Ho, Er, La, Y, Tb, and mixtures thereof, and TM is a transition metal selected from the group consisting of Zr, Hf, Ti, Mn, Cr, Nb, Mo, W, V, Ni, Ta, and mixtures thereof. Preferably, the alloy is one in which the rare earth metal is Sm, as for example represented by the formula $Sm_2TM_{17}$Preferably, the transition metal components are Co, Fe, Cu and Zr.

The present invention may be used with the RE-TM alloys as taught in U.S. Pat. No. 6,451,132 which are useful as permanent magnets in high temperature applications. For example, U.S. Pat. No. 6,451,132 teaches preferred alloy compositions having the general formula $RE(Co_wFe_vCu_xT_y)_z$, where RE is a rare earth element selected from the group consisting of Sm, Gd, Pr, Nd, Dy, Ce, Ho, Er, La, Y, Tb, and mixtures thereof, T is a transition metal selected from the group consisting of Zr, Hf, Ti, Mn, Cr, Nb, Mo, W, V, Ni, Ta, and mixtures thereof, the sum of w, v, x and y is 1; and z has a value between about 6.5 and 8.0In these alloy compositions, preferably the effective z is between about 6.5 and about 8.0, w is between about 0.50 and about 0.85, v is between 0.0 and about 0.35, x is between about 0.05 and about 0.20, and y is between about 0.01 and about 0.05.

In one embodiment of U.S. Pat. No. 6,451,132, the alloy comprises from between about 22.5% and about 35.0% by weight effective Sm (samarium), between about 42% and about 65% by weight Co (cobalt), between 0.0% and about 25% by weight Fe (iron), between about 2.0% and about 17.0% by weight Cu (copper), and between about 1.0% and about 5.0% by weight Zr (zirconium). In another embodiment, the alloy comprises from between about 23.5% and about 28.0% by weight effective Sm, from between about 50% and about 60% by weight Co, from between about 4.0% and about 16% by weight Fe, from between about 7.0% and about 12% by weight Cu, and from between about 2.0% and about 4.0% by weight T, where T is selected from Zr, Hf, Ti, Mn, Cr, Nb, Mo, W, V, Ni, Ta. In another embodiment, the alloy comprises about 24.7% by weight effective Sm, about 57.8% by weight Co, about 7.0% by weight Fe, about 7.1% by weight Cu, and about 3.4% by weight of a mixture of Zr and Nb. In yet another embodiment, the alloy comprises about 26% by weight effective Sm, about 59.5% by weight Co, about 3.3% by weight Fe, about 7.6% by weight Cu, and about 3.6% by weight of a mixture of Zr and Nb. In yet another embodiment, the alloy comprises about 26% by weight effective Sm, about 61.0% by weight Co, about 1.0% by weight Fe, about 8.2% by weight Cu, and about 3.8% by weight of a mixture of Zr and Nb.

The noble metal diffusion layer should be provided on the substrate to a thickness sufficient to prevent degradation of the underlying substrate. The thickness of the barrier may depend on factors such as the severity of the ambient conditions to which the protected substrate will be exposed. The barrier preferably has a thickness of at least 2 μm, more preferably at least 5 μm, and preferably no more than 30 μm, more preferably no more than 15 μm. A typical thickness is about 10 μm.

Preferably, the noble metal diffusion barrier is in contact with the RE-TM alloy substrate on one side, the opposite side being exposed to the exterior environment. In other words, the noble metal layer represents the only protective coating on the substrate. For the avoidance of doubt, however, it should be understood that the present invention broadly encompasses embodiments in which additional coatings to the noble metal layer may also be provided on the alloy substrate.

Preferably, the noble metal is selected from platinum, palladium, ruthenium and rhodium, and is preferably platinum or palladium, most preferably platinum.

In a preferred embodiment, the noble metal coating on the alloy substrate may be formed by an electroplating method. In this method, the surface to be coated is made the cathode in an electroplating solution or bath which comprises a source of ions of the noble metal. By applying a suitable current across the solution, the noble metal is reduced and is deposited on the alloy substrate. More information on electroplating may be found in, for example, Kirk Othmer Encyclopedia of Chemical Technology, $3^{rd}$ edition, the contents of which are incorporated herein by reference. Preferably, the electroplating solution is an aqueous solution of a salt of the noble metal. For example, where the metal to be plated is platinum, a solution of platinum phosphate may be employed. Where the noble metal diffusion barrier is provided by an electroplating technique, it is preferred that low current density conditions are employed.

Other, non-electrolytic, methods for providing a noble metal coating on a substrate are well known to the skilled person and may be used. For example, vacuum evaporation, chemical vapour deposition or ion sputter deposition methods may be used.

The noble metal coating may be applied in one or more application steps. A single application step is preferred. However, when more than one successive application step is used, the coating will preferably be built up in the successive steps, each step comprising application of a layer (preferably substantially uniform in thickness and continuous) constituting a portion of the coating.

The coating may be applied to the whole or any one or more portions of the surface of the alloy substrate or structure. The selection of which surface region or regions require a diffusion barrier will be well within the ability of those skilled in this art.

The diffusion barrier formed according to the present invention may be overlay-coated by one or more further protective coatings, as will be readily apparent to those skilled in this art.

The present invention provides an improved or at least alternative degradation (e.g. oxidation and elemental depletion) resistant RE-TM alloy structure, together with a method for protecting RE-TM alloy substrates against such degradation damage. Magnetic alloy structures according to the present invention are particularly but not exclusively suitable for use in high temperature oxidative or corrosive environments such as aero-engines.

The metallic diffusion barriers according to the present invention possess improved resistance to surface oxidation, oxygen diffusion and elemental depletion. Furthermore, the diffusion barrier is ductile enough to expand and contract with the alloys during thermal cycling.

In those embodiments of the invention utilising a metallic platinum diffusion barrier, it is thought that the advantageous properties result from the platinum being both inert with regard to oxygen, thereby providing oxidation resistance, and also being of a suitable atomic size which enables it to act as a diffusion barrier, thereby preventing oxygen diffusion and elemental depletion.

In addition, platinum has the advantage that it does not induce alloy instability or form a damaging intermetallic phase when in intimate contact with $Sm(Co_wFe_vCu_xZr_y)_z$ magnetic alloys.

The invention claimed is:

1. A rare earth transition metal (RE-TM) alloy structure comprising a RE-TM alloy substrate and a noble metal diffusion barrier disposed thereon, wherein the RE-TM alloy is a Sm—Co—Cu—Fe-T magnetic alloy, wherein T is at least one transition metal element selected from the group consisting of Zr, Hf, Ti, Mn, Cr, Nb, Mo, W, V, Ni, Ta and mixtures thereof, and the noble metal diffusion barrier comprises platinum metal.

2. A structure according to claim 1, wherein the noble metal layer is in direct contact with the alloy substrate on one side, the opposite side being exposed to the exterior environment.

3. A structure according to claim 2, which is a permanent magnet article.

4. A structure according to claim 1, which is a permanent magnet article.

5. A permanent magnet article of claim 4 which is an aerospace component.

6. A structure according to claim 1, wherein the RE-TM alloy is a Sm—Co—Cu—Fe—Zr magnetic alloy.

7. A structure according to claim 6, wherein the noble metal layer is in direct contact with the alloy substrate on one side, the opposite side being exposed to the exterior environment.

8. A structure according to claim 6, which is a permanent magnet article.

9. A method of forming a structure according to claim 1, wherein the noble metal diffusion barrier is formed by electroplating.

10. A method of forming a structure according to claim 2, wherein the noble metal diffusion barrier is formed by electroplating.

11. A method of forming a structure according to claim 4, wherein the noble metal diffusion barrier is formed by electroplating.

12. A method of forming a structure according to claim 5, wherein the noble metal diffusion barrier is formed by electroplating.

13. A method of forming a structure according to claim 6, wherein the noble metal diffusion barrier is formed by electroplating.

14. A method of reducing rare earth metal depletion at the surface of a RE-TM permanent magnet, wherein said method comprises providing over the surface a noble metal diffusion barrier, wherein the RE-TM alloy is a Sm—Co—Cu—Fe-T magnetic alloy, wherein T is at least one transition metal element selected from the group consisting of Zr, Hf, Ti, Mn, Cr, Nb, Mo, W, V, Ni, Ta and mixtures thereof, and the noble metal diffusion barrier comprises platinum metal.

15. A method according to claim 14, wherein the RE-TM permanent magnet is a high temperature permanent magnet.

* * * * *